United States Patent
Cui et al.

(10) Patent No.: US 12,035,226 B2
(45) Date of Patent: Jul. 9, 2024

(54) MECHANISMS OF SEARCHER NUMBER EXCHANGE FOR CELL DETECTION AND MEASUREMENT IN NEW RADIO (NR)

(71) Applicant: Apple Inc., Cupertino, CA (US)

(72) Inventors: Jie Cui, San Jose, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US); Yang Tang, San Jose, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 17/439,288

(22) PCT Filed: Feb. 12, 2020

(86) PCT No.: PCT/CN2020/074941
§ 371 (c)(1),
(2) Date: Sep. 14, 2021

(87) PCT Pub. No.: WO2021/159345
PCT Pub. Date: Aug. 19, 2021

(65) Prior Publication Data
US 2022/0377651 A1 Nov. 24, 2022

(51) Int. Cl.
*H04W 48/16* (2009.01)
*H04W 48/20* (2009.01)

(52) U.S. Cl.
CPC .......... *H04W 48/16* (2013.01); *H04W 48/20* (2013.01)

(58) Field of Classification Search
CPC .............................. H04W 48/16; H04W 48/20
See application file for complete search history.

(56) References Cited

U.S. PATENT DOCUMENTS 9,226,290 B2  12/2015  Gaal et al.
11,516,683 B2  11/2022  Harada
(Continued)

FOREIGN PATENT DOCUMENTS

CN  110475281 A  11/2019
JP  2015-529416 A  10/2015
(Continued)

OTHER PUBLICATIONS

Qualcomm Incorporated, "Email discussion [70#17] for 4C-HSDPA WI," 3GPP TSG-RAN WG2 #70bis, R2-103807, Jun. 28, 2010; 17 pages.
(Continued)

*Primary Examiner* — Ernest G Tacsik
(74) *Attorney, Agent, or Firm* — Sterne, Kessler, Goldstein & Fox P.L.L.C.

(57) ABSTRACT

Some embodiments of this disclosure include apparatuses and methods for implementing mechanisms for exchanging a searcher number between an electronic device (for example, a UE) and a network for cell detection and measurement. For example, some embodiments relate to an electronic device including a transceiver and a processor communicatively coupled to the transceiver. The processor determines a searcher number associated with the electronic device. The searcher number is greater than two. The
(Continued)

processor further transmits, using the transceiver, a signal to the network, where the signal includes an indication of the searcher number.

18 Claims, 5 Drawing Sheets

(56) References Cited

U.S. PATENT DOCUMENTS

| | | | |
|---|---|---|---|
| 2013/0308481 A1 | 11/2013 | Kazmi et al. | |
| 2019/0034801 A1 | 1/2019 | Sodhani et al. | |
| 2019/0097690 A1 | 3/2019 | Kim et al. | |
| 2019/0182900 A1* | 6/2019 | Cui | H04W 56/001 |
| 2019/0207722 A1* | 7/2019 | Gao | H04B 7/088 |
| 2019/0215220 A1* | 7/2019 | Islam | H04W 74/0833 |
| 2019/0223033 A1 | 7/2019 | Nam et al. | |
| 2019/0274146 A1* | 9/2019 | Tang | H04W 24/10 |
| 2019/0306734 A1* | 10/2019 | Huang | H04W 24/08 |
| 2019/0349801 A1* | 11/2019 | Nurminen | H04W 36/0088 |
| 2020/0029297 A1* | 1/2020 | Baek | H04W 76/11 |
| 2021/0084511 A1* | 3/2021 | Harada | H04W 24/10 |
| 2021/0250851 A1* | 8/2021 | Dalsgaard | H04W 76/15 |
| 2022/0295300 A1* | 9/2022 | Takada | H04W 72/046 |

FOREIGN PATENT DOCUMENTS

| | | |
|---|---|---|
| JP | 2016-213805 A | 12/2016 |
| WO | WO 2019/138500 A1 | 7/2019 |
| WO | WO 2019161569 A1 | 8/2019 |

OTHER PUBLICATIONS

"RAN4 #87 Meeting report," 3GPP TSG-RAN WG4 Meeting #88, R4-1809601, Aug. 20, 2018; 932 pages.

Intel Corporation, "Discussion about inter-frequency measurement without gap," 3GPP TSG-RAN WG4 Meeting #93, R4-1913453, Nov. 8, 2019; 6 pages.

NTT DOCOMO, Inc., "Remaining issues on requirements of inter-frequency measurement," 3GPP TSG RAN WG4 Meeting #88bis, R4-1812709, Sep. 28, 2018; 7 pages.

Apple Inc., Intel Corp., "Motivation paper on Rel-17 further RRM enhancement (FeRRM)," 3GPP TSG-RAN4 Meeting #94bis-e, R4-2003406, Apr. 10, 2020; 12 pages.

"5G; NR; Requirements for support of radio resource management," 3GPP TS 38.133, version 15.3.0, Release 15, ETSI, Oct. 2018; 134 pages.

"5G; NR; Requirements for support of radio resource management," 3GPP TS 38.133, version 15.6.0, Release 15, ETSI, Jul. 2019; 1001 pages.

International Search Report and Written Opinion directed to related International Application No. PCT/CN2020/074941, dated Nov. 25, 2020, 9 pages.

Nokia et al., "RRM requirements and scaling," 3GPP TSG-RAN WG4 Meeting #81, R4-1609752, Nov. 18, 2016 (Nov. 18, 2016), 2 pages.

Huawei et al., "Discussions on the SSB-based intra-frequency measurement requirements," 3GPP TSG-RAN WG4 Meeting AH-180, R4-1802589, Mar. 2, 2018 (Mar. 2, 2018), 5 pages.

* cited by examiner

MECHANISMS OF SEARCHER NUMBER EXCHANGE FOR CELL DETECTION AND MEASUREMENT IN NEW RADIO (NR)

This application is a U.S. National Phase of International Application No. PCT/CN2020/074941, filed Feb. 12, 2020, which is hereby incorporated by reference in its entirety.

BACKGROUND

Field

The described embodiments generally relate to cell detection and measurement in wireless communications. For example, the embodiments of this disclosure relate to mechanisms for exchanging a searcher number between an electronic device (for example, a user equipment (UE)) and a network for cell detection and measurement.

Related Art

While a user equipment (UE) is connected to a base station (for example, an evolved Node B (eNB)) in one cell to communicate through the wireless network associated to that base station, the UE can actively detect and/or measure other carriers on the cell and/or detect and/or measure other cells. For example, the UE can detect and measure other carriers on the same cell and/or detect and measure the neighboring cells. The UE can perform this detection and measurement operation to determine whether other carriers the in same cell and/or other cells in the neighborhood of the cell have better conditions. For example, the UE can measure a reference signal received power (RSRP) associated with the other carriers and/or neighboring cells. If the UE determines that one or more of the other carriers and/or one or more neighboring cells have better conditions for communicating through the wireless network, the UE can trigger a reselection procedure use other carrier(s) of the cell and/or connect to neighboring cell(s).

SUMMARY

Some embodiments of this disclosure include apparatuses and methods for implementing mechanisms for exchanging a searcher number between an electronic device (for example, a UE) and a network for cell detection and measurement. By using more searchers in the UE, UE can concurrently detect and measure multiples carriers and/or cells. Therefore, detection time/delay and measurement time/delay can be reduced, and the UE can more efficiently detect and connect to other carriers) and/or cell(s) if needed. Some aspects of this disclosure are directed to mechanisms for exchanging the number of UE's searchers (searcher number—the number of parallel carriers monitored by the UE) between the UE and network. The mechanisms for exchanging the searcher number of some aspects of this disclosure can increase the network performance and improve network configuration on, for example, synchronization signal block (SSB) based measurement timing configuration (SMTC) periodicity.

Some aspects of this disclosure relate to an electronic device. The electronic device includes a transceiver configured to communicate over a wireless network and a processor communicatively coupled to the transceiver. The processor determines a searcher number associated with the electronic device. The searcher number is equal to or greater than two. The processor further transmits, using the transceiver, a signal to the network, where the signal includes an indication of the searcher number.

Some aspects of this disclosure relate to an electronic device. The electronic device includes a transceiver configured to communicate over a wireless network and a processor communicatively coupled to the transceiver. The processor determines a first searcher number associated with a first capability of the electronic device and a second searcher number associated with a second capability of the electronic device. The processor further transmits, using the transceiver, a signal to the network, where the signal includes an indication of the first and second searcher numbers.

Some aspects of this disclosure relate to an electronic device. The electronic device includes a transceiver configured to communicate over a wireless network and a processor communicatively coupled to the transceiver. The processor receives, using the transceiver, a signal from a user equipment (UE) and determines, using the received signal, a searcher number associated with the UE. The searcher number is equal to or greater than two.

Some aspects of this disclosure relate to an electronic device. The electronic device includes a transceiver configured to communicate over a wireless network and a processor communicatively coupled to the transceiver. The processor receives, using the transceiver, a signal from a user equipment (UE) and determines, using the received signal, an indication of a 3rd Generation Partnership Project (3GPP) release version used by the UE. In response to the indication representing the release version of R-X or earlier, the processor determines that a searcher number associated with the UE is two. In response to the indication representing the release version of R-(X+1) or later, the processor determines that the searcher number associated with the UE is greater than two, wherein X is an integer equal to or greater than sixteen.

Some aspects of this disclosure relate to an electronic device. The electronic device includes a transceiver configured to communicate over a wireless network and a processor communicatively coupled to the transceiver. The processor receives, using the transceiver, a signal from a user equipment (UE) and determines, using the received signal a first searcher number associated with a first capability of the electronic device and a second searcher number associated with a second capability of the electronic device.

Some aspects of this disclosure relate to a method. The method includes determining, by a user equipment (UE), a searcher number associated with the UE. The searcher number includes a number of parallel carriers monitored by the UE and is equal to or greater than two. The method farther includes transmitting, by the UE to a network, a signal including an indication of the searcher number. The method also includes determining a carrier specific scaling factor (CSSF) based on the searcher number and using the CSSF in deciding a carrier detection time or a carrier measurement time.

Some aspects of this disclosure relate to a method. The method includes determining, by a user equipment (UE), a first searcher number associated with a first capability of the UE and a second searcher number associated with a second capability of the UE. Each of the first and second searcher numbers includes a positive integer number. The method further includes transmit, by the UE to a network, a signal including an indication of the first and second searcher numbers. The method also includes determining a carrier specific scaling factor (CSSF) based on the searcher number and using the CSSF in deciding a carrier detection time or a carrier measurement time.

Some aspects of this disclosure relate to a method. The method includes receiving, by a base station, a signal from a user equipment (UE) and determining, by the base station and using the received signal, a searcher number associated with the UE. The searcher number includes a number of parallel carriers monitored by the UE and is equal to or greater than two.

Some aspects of this disclosure relate to a method. The method includes receiving, by a base station, a signal from a user equipment (UE) and determining, by the base station and using the received signal, an indication of a 3rd Generation Partnership Project (3GPP) release version used by the UE. In response to the indication representing the release version of R-X or earlier, the method includes determining that a searcher number associated with the UE is two. In response to the indication representing the release version of R-(X+1) or later, the method includes determining that the searcher number associated with the UE is greater than two, wherein X is an integer equal to or greater than sixteen.

Some aspects of this disclosure relate to a method. The method includes receiving, by a base station, a signal from a user equipment (UE) and determining, by the base station and using the received signal, a first searcher number associated with a first capability of the UE and a second searcher number associated with a second capability of the UE. Each of the first and second searcher numbers includes a positive integer number.

Some aspects of this disclosure relate to a non-transitory computer-readable medium storing instructions. When the instructions are executed by a processor of a user equipment (UE), the instructions cause the processor to perform operations including determining a searcher number associated with the UE, where the searcher number includes a number of parallel carriers monitored by the UE and is equal to or greater than two. The operations further include transmitting, to a network, a signal comprising an indication of the searcher number. The operations further include determining a carrier specific scaling factor (CSSF) based on the searcher number and using the CSSF deciding a carrier detection time or a carrier measurement time.

Some aspects of this disclosure relate to a non-transitory computer-readable medium storing instructions. When the instructions are executed by a processor of a user equipment (UE), the instructions cause the processor to perform operations including determining a first searcher number associated with a first capability of the UE and a second searcher number associated with a second capability of the UE. Each of the first and second searcher numbers includes a positive integer number. The operations further include transmit, to a network a signal including an indication of the first and second searcher numbers. The operations also include determining a carrier specific scaling factor (CSSF) based on the searcher number and using the CSSF in deciding a carrier detection time or a carrier measurement time.

Some aspects of this disclosure relate to a non-transitory computer-readable medium storing instructions. When the instructions are executed by a processor of a base station, the instructions cause the processor to perform operations including receiving a signal from a user equipment (UE) and determining, using the received signal, a searcher number associated with the UE. The searcher number includes a number of parallel carriers monitored by the UE and is equal to or greater than two.

Some aspects of this disclosure relate to a non-transitory computer-readable medium storing instructions. When the instructions are executed by a processor of a base station, the instructions cause the processor to perform operations including receiving a signal from a user equipment (UE) and determining, using the received signal, an indication of a 3rd Generation Partnership Project (3GPP) release version used by the UE. In response to the indication representing the release version of R-X or earlier, the operations include determining that a searcher number associated with the UE is two. In response to the indication representing the release version of R-X or later, the operations include determining that the searcher number associated with the UE is greater than two, wherein X is an integer equal to or greater than sixteen.

Some aspects of this disclosure relate to a non-transitory computer-readable medium storing instructions. When the instructions are executed by a processor of a base station, the instructions cause the processor to perform operations including receiving a signal from a user equipment (UE) and determining, using the received signal, a first searcher number associated with a first capability of the electronic device and a second searcher number associated with a second capability of the electronic device. Each of the first and second searcher numbers includes a positive integer number.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
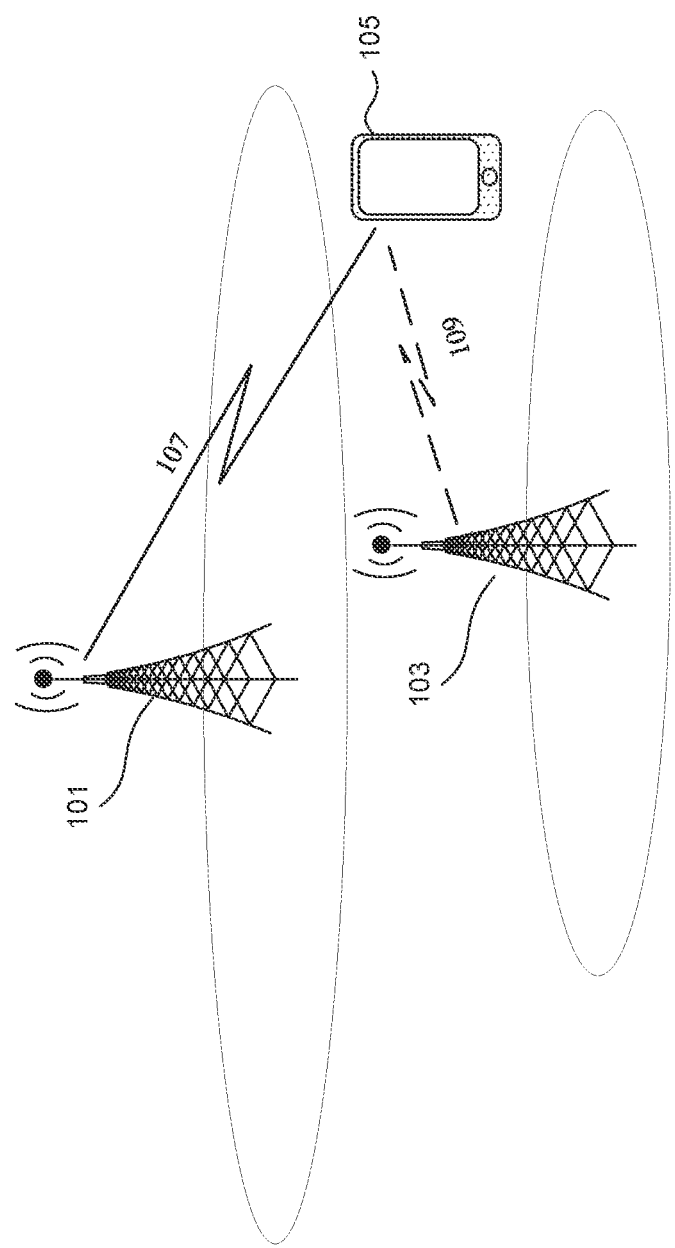
FIG. 1 illustrates an example system 100 implementing mechanisms for exchanging a searcher number between an electronic device and a network for carrier/cell detection and measurement, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing mechanisms for exchanging a searcher number between an electronic device (for example, a UE) and a network for cell detection and measurement. By using more searchers in the UE, UE can concurrently detect and measure multiples carriers and/or cells. Therefore, detection time/delay and measurement time/delay can be reduced, and the UE can more efficiently detect and connect to other carrier(s) and/or cell(s) if needed. Some aspects of this disclosure are directed to mechanisms for exchanging the number of UE's searchers (searcher number—the number of parallel carriers monitored by the UE) between the UE and network. The mechanisms for exchanging the searcher number of some aspects of this disclosure can increase the network performance and improve network configuration on, for example, synchronization signal block (SSB) based measurement timing configuration (SMTC) periodicity.

According to some aspects, a UE that operates according to Release 15 (Rel-15) and Release 16 (Rel-16) new radio (NR) of $5^{th}$ generation (5G) wireless technology for digital cellular networks as defined by 3rd Generation Partnership Project (3GPP) uses a searcher number of two that indicates its number of parallel carriers monitoring capability. The UE operating the Rel-16 and Rel-15 (or earlier) does not communicates its searcher number of two to the network with which the UE is communicating, In Rel-16 and Rel-15 (or earlier), the searcher number is a fixed number (two) and is known by both UE and a base station (or a network associated with the base station). In Rel-16 and Rel-15 (or earlier), there is no exchange of the searcher number between the UE and the network.

In this example, the UE with the searcher number two can concurrently detect and measure two carriers and/or cells. In other words, while the UE is connected to a first eNB on a first cell using a first carrier, the UE can detect and measure two other carriers concurrently. In some examples, the two other carriers can be associated with the first cell. Alternatively, the two other carriers can be on one or two cells neighboring the first cell. Additionally, or alternatively, one of the two other carriers can be on the first cell and the other one on a neighboring cell. The aspects of this disclosure can include other examples of carriers being detected and measured. The UE detects and measure these two other carriers to determine if they have better conditions compared to the first carrier.

The UE's searcher number can determine a detection time/delay and a measurement time/delay associated with detecting and measuring the additional carriers. In some aspects, the detection and measurement times/delays are times/delays that the UE experiences in detecting and measuring carriers within a space of available carriers.

The cell serving the UE can communicate to the UE a measurement gap signal. The measurement gap signal informs the UE of time intervals that the UE can use to detect and measure other carriers. Additionally, other carriers to be detected and measured can have associated synchronization signal block (SSB) based measurement timing configuration (SMTC) periodicity. According to some aspects, one SMTC periodicity can be defined for each carrier that UE is to measure and can indicate the timings for measuring that carrier later. According to some aspects, the UE can measure a carrier when a UE's measurement gap aligns with that carrier's SMTC period. According to some aspects, scaling factors (as defined in the 3GPP standard) are factors that affect the detection and measurement times/delays. In some examples, the scaling factors are based on the UE's searcher number. Additionally, a communication network associated with the base stations communicating with the UE can decide the configuration of the SMTC periodicity based on this expected detection and measurement times/delays.

Table 1 illustrates one exemplary carrier specific scaling factor (CSSF) for different scenarios.

TABLE 1

| | $CSSF_{outside-gap, i}$ Scaling Factor for Standalone (SA) Operation Mode | | | | |
|---|---|---|---|---|---|
| Scenario | $CSSF_{outside-gap, i}$ for FR1 PCC | $CSSF_{outside-gap, i}$ for FR1 SCC | $CSSF_{outside-gap, i}$ for FR2 PCC | $CSSF_{outside-gap, i}$ for FR2 SCC where neighbor cell measurement is required | $CSSF_{outside-gap, i}$ for FR2 SCC where neighbor cell measurement is not required |
| FR1 only CA | 1 | Number of configured FR1 SCell(s) | N/A | N/A | N/A |
| FR2 only intra band CA | N/A | N/A | 1 | N/A | Number of configured FR2 SCell(s) |
| FR1 + FR2 CA (FR1 PCell) | 1 | 2 × (Number of configured SCell(s) − 1) | N/A | 2 | 2 × (Number of configured SCell(s) − 1) |

In Table 1, FR1 corresponds to the Frequency Range 1 and FR2 correspond to the Frequency Range 2. In some aspects, in 5G New Radio (NR), Frequency Range 1 (FR1) can include sub-6 GHz frequency hands and Frequency Range 2 (FR2) can include frequency bands in the mmWave range (for example, 24-100 GHz). In some aspect, FR1 can include the frequencies between about 410 MHz and about 7.125 GHz. In some aspects, FR2 can include frequencies between about 24.250 GHz and about 52.6 GHz.

In Table 1, CA corresponds to Carrier Aggregation. According to some aspects, the UE (and the communication network) are configured to aggregate and use a plurality of carriers simultaneously. In some examples, the UE can use a primary component carrier (PCC) with one or more secondary component carriers (SCC). The carriers can be used using Frequency Division Duplex (FDD), Time Division Duplex, or a mix of TDD and FDD. In some examples, the PCC can be used for control signaling and SCC(s) can be used for data. However, the aspects of this disclosure are not limited to these examples.

In Table 1, PCell corresponds to Primary cell and SCell corresponds to the Secondary cell. In some examples, PCell can stay in an activated state while SCell can transition between activated and deactivated states. In some examples, SCell can be a supplementary serving cell for data transmission and/or reception.

In some examples, Table 1 can correspond to Table 9.1.5.1.2-1 of TS38.133 specification. In the exemplary Table 1, the UE has a searcher number of two.

In one example, considering the scenario of "FR1 only CA" in Table 1, the UE will reserve one of its searchers for the primary component carrier (PCC) on FR1 (line 2, column 2.) Then the UE can use the other searcher for one or more SCells configured in FR1 (line 2, column 3.) In other words, the one or more SCells will share the other searcher of the UE. In this example, the scaling factor for FR1 SCC is Number of configured FR1 SCell(s).

As another example, considering the scenario of "FR2 only intraband CA" in Table 1, the UE will reserve one of its searchers for the primary component carrier (PCC) on FR2 (line 3, column 4.) Then the UE can use the other searcher for one or more SCells configured in FR2. In other words, the one or more SCells on FR2 will share the other searcher of the UE (line 3, column 6.) In this example, the scaling factor for FR2 SCC where neighbor cell measurement is not required is Number of configured FR2 SCell(s).

According to some aspects, the UE uses more than two searchers. Additionally, or alternatively, the UE can use one or more searchers associated with each Frequency Range (FR). In some aspects, the UE can use one or more searchers associated with each Timing Advance (TA) Group (TAG). For example, the UE using Release 17 (Rel-17) or later can use more than two searchers and can communicate to the network its searcher number. Additionally, or alternatively, the UE using Rel-17 or later can use one or more searchers associated with each Frequency Range (FR) and can communicate to the network its capabilities. In some aspects, the UE using Rel-17 or later can use one or more searchers associated with each Timing Advance (TA) Group (TAG) and can communicate to the network its capabilities.

By using more than two searchers (and/or using one or more searchers for each FR and/or each TAG), the UE can concurrently detect and measure multiples carriers and/or cells. Therefore, detection time/delay and measurement time/delay can be reduced, and the UE can more efficiently detect and connect to other carrier(s) and/or cell(s) if needed. Some aspects of this disclosure are directed to mechanisms for exchanging the number of UE's searchers (searcher number—the number of parallel carriers monitored by the UE) between the UE and network. The mechanisms for exchanging the searcher number of some aspects of this disclosure can increase the network performance and improve network configuration on, for example, synchronization signal block (SSB) based measurement timing configuration (SMTC) periodicity.

FIG. 1 illustrates an example system 100 implementing mechanisms for exchanging a searcher number between an electronic device and a network for carrier/cell detection and measurement, according to some aspects of the disclosure. Example system 100 is provided for the purpose of illustration only and does not limit the disclosed embodiments. System 100 may include, but is not limited to, network nodes (for example, base stations such as eNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 17 (Rel-17) or later. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) can include nodes configured to operate based on a wide variety of wireless communication techniques such as, but not limited to, techniques based on 3GPP standards. For example, base stations 103 and 105 can include nodes configured to operate using Release 17 (Rel-17) or later.

According to some aspects, UE 105 and base stations 101 and 103 are configured to implement mechanisms for exchanging a searcher number between UE 101 and a network associated with base stations 101 and 103 for carrier/cell detection and measurement. For example, UE 105 can be connected to and can be communicating with base station 101 using carrier 107. According to some aspects, carrier 107 can include one carrier. Additionally, or alternatively, carrier 107 can include two or more component carriers (CC). In other words, UE 105 can implement carrier aggregation (CA). For example, UE can use multiple carriers for communication with base station 101. In some examples, the UE can use a primary component carrier (PCC) with one or more secondary component carriers (SCC). The carriers can be used using Frequency Division Duplex (FDD), Time Division Duplex, or a mix of TDD and FDD. In some examples, the PCC can be used for control signaling and SCC(s) can be used for data. However, the aspects of this disclosure are not limited to these examples.

According to some aspects, UE 105 can have two or more searchers. In other words, UE 105 can be configured to detect and measure two or more carriers/cells in parallel (concurrently). In these examples, UE 105 has a searcher number (which is an integer number equal to two or greater than two) to concurrently detect and measure two or more carriers cells. For example, while UE 105 is connected to a base station 101 using carrier 107, UE 105 can detect and measure two or more other carriers concurrently. In some examples, the two or more other carriers can be on the cell associated with base station 101. In other words, UE 105 can detect and measure two or more carriers (in addition to carrier 107) associated with base station 101.

Additionally, or alternatively, the two or more other carriers can be on one or more cells neighboring the cell associated with base station 101. For example, UE 105 can detect and measure two or more carriers (for example, carriers 109) associated with base station 103 located in a neighboring cell. In another example, UE 105 can detect and measure one or more carriers associated with base station 103 and can detect and measure one or more carrier associated with another base station (not shown).

Additionally, or alternatively, one or more of the two or more other carriers can be associated with base station 101 and the other carrier can be associated with base station 103 located in the neighboring cell. The aspects of this disclosure can include other examples of carriers being detected and measured. UE 105 detects and measure these two or more other carriers to determine if they have better conditions compared to carrier 107. If UE 105 detects that one or more of the two or more other carriers have better condition(s) that one or more of carrier 107, UE 105 can initiate an operation to switch to the carriers with better conditions. In some examples, the condition(s) can include, but is not limited to, delay associated with a carrier, noise associated with the carrier, inter and/or intra interference associated with the carrier, and the like. The aspects of this disclosure are not limited to these examples and UE 105 can measure other conditions on the carrier.

As discussed above, according to some aspects, UE 105 uses more than two searchers (has a searcher number of an integer greater than two). Additionally, or alternatively, UE 105 can use one or more searchers associated with each Frequency Range (FR). In some aspects, the UE can use one or more searchers associated with each Timing Advance (TA) Group (TAG).

According to some aspects, UE 105 is configured to communicate its searcher capabilities (for example, searcher number(s)) to base station 101 and/or the network associated with base station 101 (and/or 103). For example, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some example, after receiving the setup request, and if base station 101 does not know the capabilities of UE 105, base station 101 can send a request to UE 105 to request the capabilities of UE 105. According to some aspects, UE 105 can send its capabilities to base station 101. In response, base station 101 can send an RRC connection reconfiguration message back to UE 105. Then UE 105 can start data communication using base station 101.

According to some embodiments, during the exemplary initial communication discussed above (or any other initial access), UE 105 can communicate its searcher capabilities (for example, searcher number(s)) to base station 101 and/or the network associated with base station 101 (and/or 103). In one example, UE 105 can communicate its searcher number(s) to base station 101 and/or the network associated with base station 101 (and/or 103) as a per-UE capability. For example, UE 105 can transmit its searcher number (which can be two or greater than two) to base station 101 and/or the network associated with base station 101 (and/or 103). In some examples, UE 105 can use a RRC layer signaling from UE 105 to base station 101 and/or the network associated with base station 101 (and/or 103) to transmit its searcher number. Additionally, or alternatively, UE 105 can use Medium Access Control (MAC) layer signaling from UE 105 to base station 101 and/or the network associated with base station 101 (and/or 103) to transmit its searcher number. Additionally, or alternatively, UE 105 can use a physical (PHY) layer indication/signaling from UE 105 to base station 101 and/or the network associated with base station 101 (and/or 103) to transmit its searcher number.

In some examples, UE 105 can communicate its searcher number(s) to base station 101 and/or the network associated with base station 101 (and/or 103) as a per-FR (Frequency Range) capability. In these examples, the searcher number can include a first searcher number associated with FR1 (indicating the number of searcher(s) supported in FR1) and a second searcher number associated with FR2 (indicating the number of searcher(s) supported in FR2). In some examples, the first searcher number can be a positive integer (one or greater than one). The second searcher number can also be a positive integer (one or greater than one). UE 105 can transmit its searcher numbers (first and second searcher numbers) to base station 101 and/or the network associated with base station 101 (and/or 103). In some examples, UE 105 can use a RRC layer signaling from UE 105 to base station 101 and/or the network associated with base station 101 (and/or 103) to transmit its first and second searcher numbers. Additionally, or alternatively, UE 105 can use Medium Access Control (MAC) layer signaling from UE 105 to base station 101 and/or the network associated with base station 101 (and/or 103) to transmit its first and second searcher numbers. Additionally, or alternatively, UE 105 can use a physical (PHY) layer indication from UE 105 to base station 101 and/or the network associated with base station 101 (and/or 103) to transmit its first and second searcher numbers.

In some examples, UE 105 can communicate its searcher number(s) to base station 101 and/or the network associated with base station 101 (and/or 103) as a per-TAG (Timing Advance (TA) Group (TAG)) capability. In these examples, the searcher number can include a first searcher number associated with pTAG (primary TAG) (indicating the number of searcher(s) supported in pTAG) and a second searcher number associated with sTAG (secondary TAG) (indicating the number of searcher(s) supported in sTAG). In some examples, the first searcher number can be a positive integer (one or greater than one). The second searcher number can also be a positive integer (one or greater than one). UE 105 can transmit its searcher numbers (first and second searcher numbers) to base station 101 and/or the network associated with base station 101 (and/or 103). In some examples, UE 105 can use a RRC layer signaling from UE 105 to base station 101 and/or the network associated with base station 101 (and/or 103) to transmit its first and second searcher numbers. Additionally, or alternatively, UE 105 can use Medium Access Control (MAC) layer signaling from UE 105 to base station 101 and/or the network associated with base station 101 (and/or 103) to transmit its first and second searcher numbers. Additionally, or alternatively, UE 105 can use a physical (PHY) layer indication/signaling from UE 105 to base station 101 and/or the network associated with base station 101 (and/or 103) to transmit its first and second searcher numbers.

According to some aspects, a TAG can be a set of serving cells that share uplink transmission timing. For example, if a serving cell belongs to a TAG, that serving cell shares uplink transmission timing with other serving cells in that TAG. According to some examples, a primary TAG (pTAG) can be a TAG that includes the primary cell (PCell) and a secondary TAG (sTAG) can be a TAG that include the secondary cell (SCell).

In some examples, UE 105 can communicate its searcher number(s) to base station 101 and/or the network associated with base station 101 (and/or 103) using UE's release version. In these examples, base station 101 (and/or the network associated with base station 101) can determine the searcher number associated with UE 105 based on the UE's release version. For example, if UE 105 (in communicating with base station 101) indicates that UE 105 operates according to Rel-16 or Rel-15 or earlier, base station 101 (and/or the network associated with base station 101) can determine that the searcher number of UE 105 is two. Additionally, or alternatively, if UE 105 (in communicating with base station 101) indicates that UE 105 operates according to Rel-17 or later, base station 101 (and/or the network associated with base station 101) can determine that the searcher number of UE 105 is two or greater than two.

Figure 2:
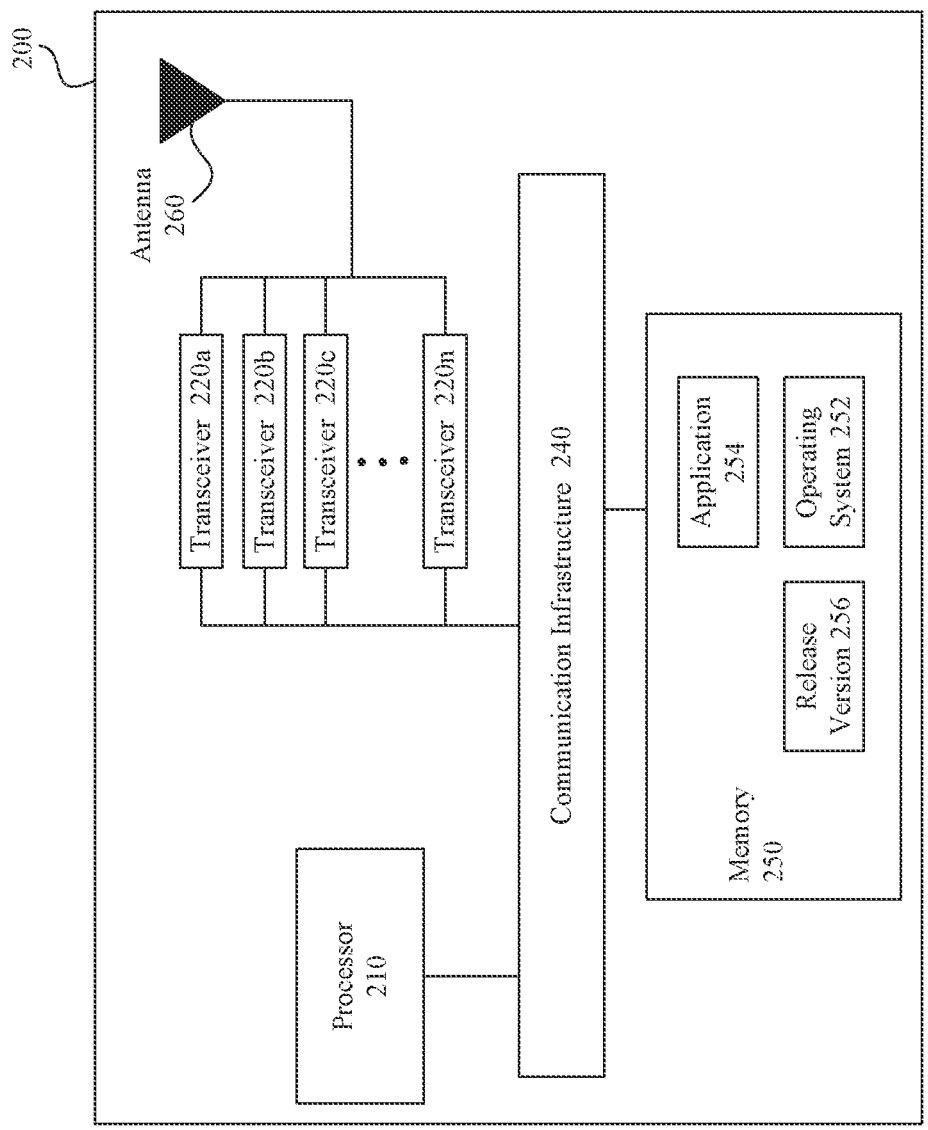
FIG. 2 illustrates a block diagram of an example system of an electronic device implementing mechanisms for exchanging a searcher number for carrier/cell detection and measurement, according to some embodiments of the disclosure.

FIG. 2 illustrates a block diagram of an example system 200 of an electronic device implementing mechanisms for exchanging a searcher number for carrier/cell detection and measurement, according to some embodiments of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for exchanging a searcher number for carrier/cell detection and measurement, as described herein. Additionally, or alternatively, one or more transceivers 220a-220n perform operations enabling system 200 of system 100 to implement mechanisms for exchanging a searcher number for carrier/cell detection and measurement, as described herein.

One or more transceivers 220a-220n transmit and receive communications signals that support mechanisms for exchanging a searcher number for carrier/cell detection and measurement and/or support the carrier detection and measurement, according to some embodiments, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects of this disclosure, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11.

Additionally, or alternatively, one or more transceivers 220a-220n can include one or more circuits (including a Bluetooth™ transceiver) to enable connections) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220a-220n, implements the searchers to detect and measure parallel carrier as discussed herein. For example, transceiver 220a can enable connection(s) and communication over a first carrier (for example, carrier 107 of FIG. 1). In this example, transceiver 220b can enable detecting and/or measuring a second carrier (for example, carrier 109 of FIG. 1), transceiver 220c can enable detecting and/or measuring a third carrier, and transceiver 220n can enable detecting and/or measuring a fourth carrier, concurrently. As discussed above, the first, second, third, and fourth carriers can be associated to same or different base stations.

Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220a-220n, implements mechanisms for exchanging a searcher number for carrier/cell detection and measurement, as described herein. Although the operations discussed herein are discussed with respect to processor 210, it is noted that processor 210, alone or in combination with computer instructions stored within memory 250, and/or one or more transceiver 220a-220n, can implement these operations. For example, processor 210 is configured to communicate searcher number(s) of system 200 to a base station (and/or a network associated with the base station) as a per-UE capability, during an initial communication discussed above (or any other initial access). Processor 210 can use a RRC layer signaling, a MAC layer, and/or a PHY layer signaling to communicate the searcher number(s) as a per-UE capability.

In another example, processor 210 can be configured to communicate searcher number(s) of system 200 to a base station (and/or a network associated with the base station) as a per-FR capability, during an initial communication discussed above (or any other initial access). Processor 210 can use a RRC layer signaling, a MAC layer, and/or a PHY layer signaling to communicate the searcher number(s) as a per-FR capability.

In another example, processor 210 can be configured to communicate searcher number(s) of system 200 to a base station (and/or a network associated with the base station) as a per-TAG capability, during an initial communication discussed above (or any other initial access). Processor 210 can use a RRC layer signaling, a MAC layer, and/or a PHY layer signaling to communicate the searcher number(s) as a per-TAG capability.

In some examples, processor 210 can communicate searcher number(s) to the base station (and/or the network associated with base station) using system 200's release version. For example, release version 256 stored in, for example, memory 250 can be indicative of whether system 200 is configured to operate at one or more of Rel-16, Rel-15, or earlier and/or Rel-17 or later. Processor 210 can generate and transmit a signal including/indicating release version 256. In these examples, base station (and/or the network associated with base station) can determine the searcher number associated with system 200 based on the release version 256. For example, if release version 256 indicates that system 200 operates according to Rel-16 or Rel-15 or earlier, the base station (and/or the network associated with base station) can determine that the searcher number of system 200 is two. Additionally, or alternatively, if release number 256 indicates that system 200 operates according to Rel-17 or later, the base station (and/or the network associated with the base station) can determine that the searcher number of system 200 is two or greater than two.

As discussed in more detail below with respect to FIGS. 3 and 4, processor 210 can implement different mechanisms for exchanging a searcher number for carrier/cell detection and measurement in system 100 of FIG. 1.

Figure 3:
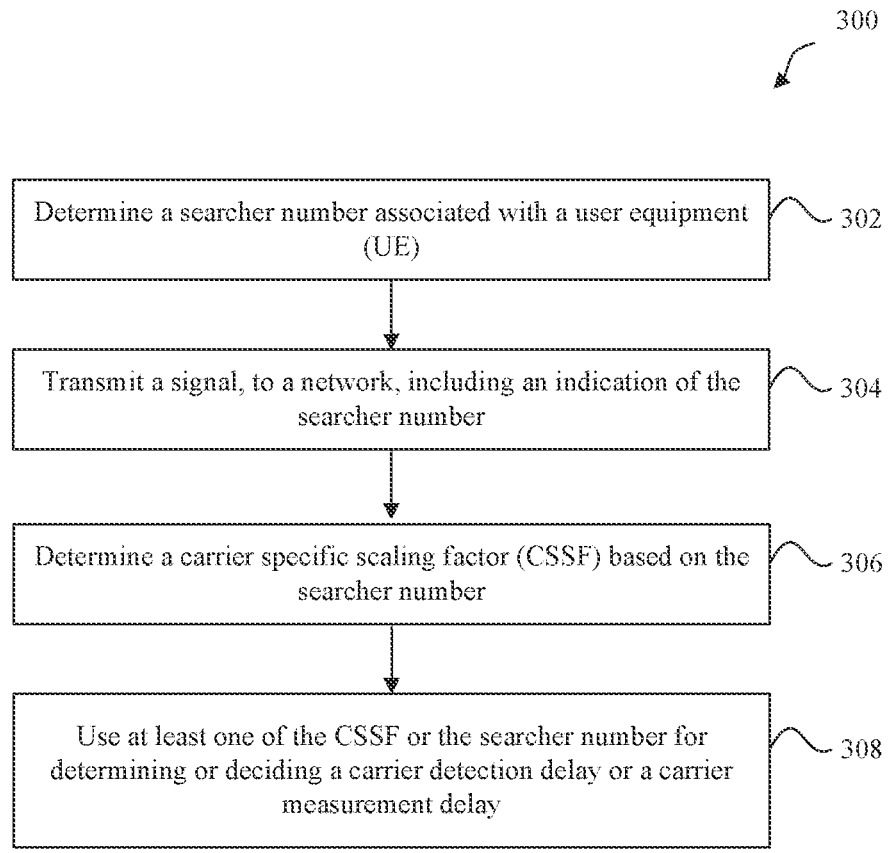
FIG. 3 illustrates an example method for a system (for example a user equipment (UE)) supporting mechanisms for exchanging a searcher number for carrier/cell detection and measurement, according to some embodiments of the disclosure.

FIG. 3 illustrates an example method 300 for a system (for example a user equipment (UE)) supporting mechanisms for exchanging a searcher number for carrier/cell detection and measurement, according to some embodiments of the disclosure. As a convenience and not a limitation, FIG. 3 may be described with regard to elements of FIGS. 1, 2, and 5. Method 300 may represent the operation of an electronic device (for example, UE 105 of FIG. 1) implementing mechanisms for exchanging a searcher number for carrier/cell detection and measurement. Method 300 may also be performed by system 200 of FIG. 2 and/or computer system 500 of FIG. 5. But method 300 is not limited to the specific embodiments depicted in those figures and other systems may be used to perform the method as will be understood by those skilled in the art. It is to be appreciated that not all operations may be needed, and the operations may not be performed in the same order as shown in FIG. 3.

At 302, a searcher number associated with the UE is determined. For example, a UE (for example, UE 105) can determine its searcher number. According to some aspects, the searcher number is based on the per-UE capability. In this example, the searcher number can be two or greater than two. Additionally, or alternatively, the searcher number can be based on the per-FR (Frequency Range) capability. In these examples, the searcher number can include a first searcher number associated with FR1 (indicating the number of searcher(s) supported in FR1) and a second searcher number associated with FR2 (indicating the number of searcher(s) supported in FR2). In some examples, the first searcher number can be one or greater than one. The second searcher number can also be one or greater than one. In some embodiments, the searcher number can be based on the per-TAG (Timing Advance (TA) Group (TAG)) capability. In these examples, the searcher number can include a first searcher number associated with pTAG (primary TAG) (indicating the number of searcher(s) supported in pTAG) and a second searcher number associated with sTAG (secondary TAG) (indicating the number of searcher(s) supported in sTAG). In some examples, the first searcher number can be one or greater than one. The second searcher number can also be one or greater than one.

Additionally, or alternatively, the UE can determine its searcher number based on an indication of a 3rd Generation Partnership Project (3GPP) release version used by the UE. For example, an indication representing the release version of R-X or earlier indicates that the searcher number associated with the UE is two. In another example, an indication representing the release version of R-(X+1) or later indicates that the searcher number associated with the UE is greater than two or greater than two. In some examples, X is an integer equal to or greater than sixteen. In one example, an indication representing the release version of R-16 or earlier indicates that the searcher number associated with the UE is two. In another example, an indication representing the release version of R-17 or later indicates that the searcher number associated with the UE is greater than two or greater than two.

At 304, a signal including an indication of the searcher number is transmitted. For example, the UE can transmit a signal including the indication of the searcher number to a base station (and/or a network associated with the base station.) In some aspects, 304 can include generating the signal that includes the indication of the searcher number. In some examples, the signal can be an existing information element (IE) modified to include the searcher number. Additionally, or alternatively, the signal can be a new IE including the indication of the searcher number.

According to some embodiments, the UE can transmit the signal including the indication of the searcher number to the base station when the UE is connecting to the base station. Additionally, or alternatively, the UE can transmit the signal including the indication of the searcher number to the base station after the UE connects to the base station. In some examples, the UE can transmit the signal including the indication of the searcher number to the base station periodically based on a given time period. In some examples, the UE can transmit the signal including the indication of the searcher number to the base station in response to receiving a request (for example, a capability inquiry) for the base station. However, the aspects of this disclosure are not limited to these methods, and the UE can transmit the signal including the indication of the searcher number to the base station using other methods and configurations.

At 306, the UE can determine a carrier specific scaling factor (CSSF) based on the searcher number. At 308, the UE can use at least one of the CSSF or the searcher number in determining and/or deciding a carrier detection time or a carrier measurement time. According to some embodiments, the UE can use the determined carrier detection time and/or the carrier measurement time in determining whether to measure a carrier and/or which carriers to measure.

Table 2 illustrates one exemplary carrier specific scaling factor (CSSF) for an E-UTRA-NR Dual Connectivity (EN-DC) case if a per-UE capability searcher number is equal to "n". Similar tables can be created for per-FR and/or per- TAG capability searcher number(s). According to some aspects, the UE, the base station, and/or the network can determine Table 2 based on the exchanged search number(s). Also, the UE, the base station, and/or the network can use Table 2 for using CSSF for determining or deciding a carrier detection time or a carrier measurement time.

Table 2 provides one example for determining CSSF by the UE and/or by the base station (or the network associated with the base station) for different scenarios. The aspects of this disclosure are not limited to this example, and the UE, base station, and/or the network can use other methods for determining CSSF based on the searcher number(s) and for using CSSF for determining or deciding a carrier detection time or a carrier measurement time.

on FR2 (line 3, column 4.) Then the UE can use the other searchers ((n−1) other searchers) for one or more SCells configured in FR2. In other words, the one or more SCells on FR2 will share the other searchers ((n−1) other searchers) of the UE (line 3, column 6.) In this example, CSSF for FR2 SCC is defined as the Ceiling (Number of configured FR2 SCell(s)/(n−1)).

Table 3 illustrates one exemplary carrier specific scaling factor (CSSF) for a Standalone operation (SA) mode case if a per-UE capability searcher number is equal to "n". Similar tables can be created for per-FR and/or per-TAG capability searcher number(s). According to some aspects, the UE, the base station, and/or the network can determine Table 3 based on the exchanged search number(s). Also, the UE, the base

TABLE 2

CSSF (Carrier Specific Scaling Factor) for EN-DC Case If Per-UE Capability Of Searcher Number = n

| Scenario | $CSSF_{outside\text{-}gap, i}$ for FR1 PSCC | $CSSF_{outside\text{-}gap, i}$ for FR1 SCC | $CSSF_{outside\text{-}gap, i}$ for FR2 PSCC | $CSSF_{outside\text{-}gap, i}$ for FR2 SCC where neighbor cell measurement is required [Note 2] | $CSSF_{outside\text{-}gap, i}$ for FR2 SCC where neighbor cell measurement is not required |
|---|---|---|---|---|---|
| EN-DC with FR1 only CA | 1 | Ceiling (Number of configured FR1 SCell(s)/(n − 1)) | N/A | N/A | N/A |
| EN-DC with FR2 only intra band CA | N/A | N/A | 1 | N/A | Ceiling (Number of configured FR2 SCell(s)/(n − 1)) |
| EN-DC with FR1 + FR2 CA (FR1 PSCell)[Note 1] | 1 | Ceiling (2 × (Number of configured SCell(s) − 1)/(n − 1)) | N/A | Ceiling (2/(n − 1)) | Ceiling (2 × (Number of configured SCell(s) − 1)/(n − 1)) |
| EN-DC with FR1 + FR2 CA (FR2 PSCell)[Note 1] | N/A | Ceiling (Number of configured SCell(s)/(n − 1)) | 1 | N/A | Ceiling (Number of configured SCell(s)/(n − 1)) |

[Note 1] Only one NR FR1 operating band and one NR FR2 operating band are included for FR1 + FR2 inter-band EN-DC.
[Note 2] Selection of FR2 SCC where neighbour cell measurement is required can follow clause 9.2.3.2 of TS38.133.

In one example, considering the scenario of "EN-DC with FR1 only CA" in Table 2, the UE will reserve one of its searchers for the primary component carrier (PCC) on FR1 (line 2, column 2.) Then the UE can use the other searchers ((n−1) other searchers) for one or more SCells configured in FR1 (line 2, column 3.) In other words, the one or more SCells will share the other searchers ((n−1) other searchers) of the UE. In this example, CSSF for FR1 SCC is defined as the Ceiling (Number of configured FR1 SCell(s)/(n−1)).

As another example, considering the scenario of "EN-DC with FR2 only intraband CA" in Table 2, the UE will reserve one of its searchers for the primary component carrier (PCC)

station, and/or the network can use Table 3 for using CSSF for determining or deciding a carrier detection time or a carrier measurement time.

Table 3 provides one example for determining CSSF by the UE and/or by the base station (or the network associated with the base station) for different scenarios. The aspects of this disclosure are not limited to this example, and the UE, base station, and/or the network can use other methods for determining CSSF based on the searcher number(s) and for using CSSF for determining or deciding a carrier detection time or a carrier measurement time.

TABLE 3

CSSF (Carrier Specific Scaling Factor) for SA Case If Per-UE Capability Of Searcher Number = n

| Scenario | $CSSF_{outside\text{-}gap, i}$ for FR1 PCC | $CSSF_{outside\text{-}gap, i}$ for FR1 SCC | $CSSF_{outside\text{-}gap, i}$ for FR2 PCC | $CSSF_{outside\text{-}gap, i}$ for FR2 SCC where neighbor cell measurement is required [Note 2] | $CSSF_{outside\text{-}gap, i}$ for FR2 SCC where neighbor cell measurement is not required |
|---|---|---|---|---|---|
| FR1 only CA | 1 | Ceiling (Number of configured FR1 SCell(s)/(n − 1)) | N/A | N/A | N/A |

TABLE 3-continued

CSSF (Carrier Specific Scaling Factor) for SA Case If Per-UE Capability Of Searcher Number = n

| Scenario | $CSSF_{outside\text{-}gap,\ i}$ for FR1 PCC | $CSSF_{outside\text{-}gap,\ i}$ for FR1 SCC | $CSSF_{outside\text{-}gap,\ i}$ for FR2 PCC | $CSSF_{outside\text{-}gap,\ i}$ for FR2 SCC where neighbor cell measurement is required [Note 2] | $CSSF_{outside\text{-}gap,\ i}$ for FR2 SCC where neighbor cell measurement is not required |
|---|---|---|---|---|---|
| FR2 only intra band CA | N/A | N/A | 1 | N/A | Ceiling (Number of configured FR2 SCell(s)/(n − 1)) |
| FR1 + FR2 CA (FR1 PCell)[Note 1] | 1 | Ceiling (2 × (Number of configured SCell(s) − 1)/(n − 1)) | N/A | Ceiling (2/(n − 1)) | Ceiling (2 × (Number of configured SCell(s) − 1)/(n − 1)) |

[Note 1] Only one FR1 operating band and one FR2 operating band are included for FR1 + FR2 inter-band CA.
[Note 2] Selection of FR2 SCC where neighbour cell measurement is required can follow clause 9.2.3.2 of TS38.133.

In one example, considering the scenario of "FR1 only CA" in Table 3, the UE will reserve one of its searchers for the primary component carrier (PCC) on FR1 (line 2, column 2.) Then the UE can use the other searchers ((n−1) other searchers) for one or more SCells configured in FR1 (line 2, column 3.) In other words, the one or more SCells will share the other searchers ((n−1) other searchers) of the UE. In this example, CSSF for FR1 SCC is defined as the Ceiling (Number of configured FR1 SCell(s)/(n−1)).

As another example, considering the scenario of "FR2 only intraband CA" in Table 3, the UE will reserve one of its searchers for the primary component carrier (PCC) on FR2 (line 3, column 4.) Then the UE can use the other searchers ((n−1) other searchers) for one or more SCells configured in FR2. In other words, the one or more SCells on FR2 will share the other searchers ((n−1) other searchers) of the UE (line 3, column 6.) In this example, CSSF for FR2 SCC is defined as the Ceiling (Number of configured FR2 SCell(s)/(n−1)).

Table 4 illustrates one exemplary carrier specific scaling factor (CSSF) for a NR Dual Connectivity (NR-DC) case if a per-UE capability searcher number is equal to "n". Similar tables can be created for per-FR and/or per-TAG capability searcher number(s). According to some aspects, the UE, the base station, and/or the network can determine Table 4 based on the exchanged search number(s). Also, the UE, the base station, and/or the network can use Table 4 for using CSSF for determining or deciding a carrier detection time or a carrier measurement time.

Table 4 provides one example for determining CSSF by the UE and/or by the base station (or the network associated with the base station) for different scenarios. The aspects of this disclosure are not limited to this example, and the UE, base station, and/or the network can use other methods for determining CSSF based on the searcher number(s) and for using CSSF for determining or deciding a carrier detection time or a carrier measurement time.

TABLE 4

CSSF (Carrier Specific Scaling Factor) for NR-DC Case If Per-UE Capability Of Searcher Number = n

| Scenario | $CSSF_{outside\text{-}gap,\ i}$ for FR1 PCC | $CSSF_{outside\text{-}gap,\ i}$ for FR1 SCC | $CSSF_{outside\text{-}gap,\ i}$ for FR2 PCC | $CSSF_{outside\text{-}gap,\ i}$ for FR2 SCC where neighbor cell measurement is not required |
|---|---|---|---|---|
| FR1 + FR2 NR-DC (FR1 PCell and FR2 PScell)[Note 1] | 1 | Ceiling (2 × (Number of configured SCell(s))/(n − 1)) | Ceiling (2/(n − 1)) | Ceiling (2 × (Number of configured SCell(s))/(n − 1)) |

[Note 1] NR-DC in Rel-15 only includes the scenarios where all serving cells in MCG in FR1 and all serving cells in SCG in FR2.

In one example, considering the scenario of "FR1+FR2 NR-DC (FR1 PCell and FR2 PScell)" in Table 4, the UE will reserve one of its searchers for the primary component carrier (PCC) on FR1 (line 2, column 2.) Then the UE can use the other searchers ((n−1) other searchers) for one or more SCells configured in FR1 (line 2, column 3), the PCC on FR2 (line 2, column 4), and one or more SCells on FR2 (line 2, column 5). In other words, the one or more SCells on FR1, PCC on FR2, and one or more SCells on FR2 will share the other searchers ((n−1) other searchers) of the UE. In this example, CSSF for FR1 SCC can be defined as the Ceiling (2×(Number of configured SCell(s))/(n−1)). The CSSF for FR2 PCC can be defined as Ceiling (2/(n−1)). The CSSF for FR2 SCC can be defined as Ceiling (2×(Number of configured SCell(s))/(n−1)).

Table 5 illustrates one exemplary carrier specific scaling factor (CSSF) for an NR-E-UTRA Dual Connectivity (NE-DC) case if a per-UE capability searcher number is equal to "n". Similar tables can be created for per-FR and/or per-TAG capability searcher number(s). According to some aspects, the UE, the base station, and/or the network can determine Table 5 based on the exchanged search number(s). Also, the UE, the base station, and/or the network can use Table 5 for using CSSF for determining or deciding a carrier detection time or a carrier measurement time.

Table 5 provides one example for determining CSSF by the UE and/or by the base station (or the network associated with the base station) for different scenarios. The aspects of this disclosure are not limited to this example, and the UE, base station, and/or the network can use other methods for determining CSSF based on the searcher number(s) and for using CSSF for determining or deciding a carrier detection time or a carrier measurement time may also be performed by system 200 of FIG. 2 and/or computer system 500 of FIG. 5. But method 400 is not limited to the specific embodiments depicted in those figures and other systems may be used to perform the method as will be understood by those skilled in the art. It is to be appreciated that not all operations may be needed, and the operations may not be performed in the same order as shown in FIG. 4.

At 402, a signal is received a user equipment (UE). For example, the base station receives a signal form the UE. The signal can include UE's capabilities. For example, the signal can include an indication of the searcher number associated with the UE.

TABLE 5

CSSF (Carrier Specific Scaling Factor)
for NE-DC Case If Per-UE Capability Of Searcher Number = n

| Scenario | $CSSF_{outside-gap, i}$ for FR1 PCC | $CSSF_{outside-gap, i}$ for FR1 SCC | $CSSF_{outside-gap, i}$ for FR2 PCC | $CSSF_{outside-gap, i}$ for FR2 SCC where neighbor cell measurement is required [Note 2] | $CSSF_{outside-gap, i}$ for FR2 SCC where neighbor cell measurement is not required |
|---|---|---|---|---|---|
| NE-DC with FR1 only CA | 1 | Ceiling (Number of configured FR1 SCell(s)/(n − 1)) | N/A | N/A | N/A |
| NE-DC with FR2 only intra band CA | N/A | N/A | 1 | N/A | Ceiling (Number of configured FR2 SCell(s)/(n − 1)) |
| NE-DC with FR1 + FR2 CA (FR1 PCell)[Note 1] | 1 | Ceiling (2 × (Number of configured SCell(s) − 1)/(n − 1)) | N/A | Ceiling (2/(n − 1)) | Ceiling (2 × (Number of configured SCell(s) − 1)/(n − 1)) |

[Note 1] Only one FR1 operating band and one FR2 operating band are included for FR1 + FR2 inter-band CA.
[Note 2] Selection of FR2 SCC where neighbour cell measurement is required can follow clause 9.2.3.2 of TS38.133.

In one example, considering the scenario of "NE-DC FR1 only CA" in Table 5, the UE will reserve one of its searchers for the primary component carrier (PCC) on FR1 (line 2, column 2.) Then the UE can use the other searchers ((n−1) other searchers) for one or more SCells configured in FR1 (line 2, column 3.) In other words, the one or more SCells will share the other searchers ((n−1) other searchers) of the UE. In this example, CSSF for FR1 SCC is defined as the Ceiling (Number of configured FR1 SCell(s)/(n−1)).

As another example, considering the scenario of "NE-DC FR2 only intraband CA" in Table 5, the UE will reserve one of its searchers for the primary component carrier (PCC) on FR2 (line 3, column 4.) Then the UE can use the other searchers ((n−1) other searchers) for one or more SCells configured in FR2. In other words, the one or more SCells on FR2 will share the other searchers ((n−1) other searchers) of the UE (line 3, column 6.) In this example, CSSF for FR2 SCC is defined as the Ceiling (Number of configured FR2 SCell(s)/(n−1)).

Figure 4:
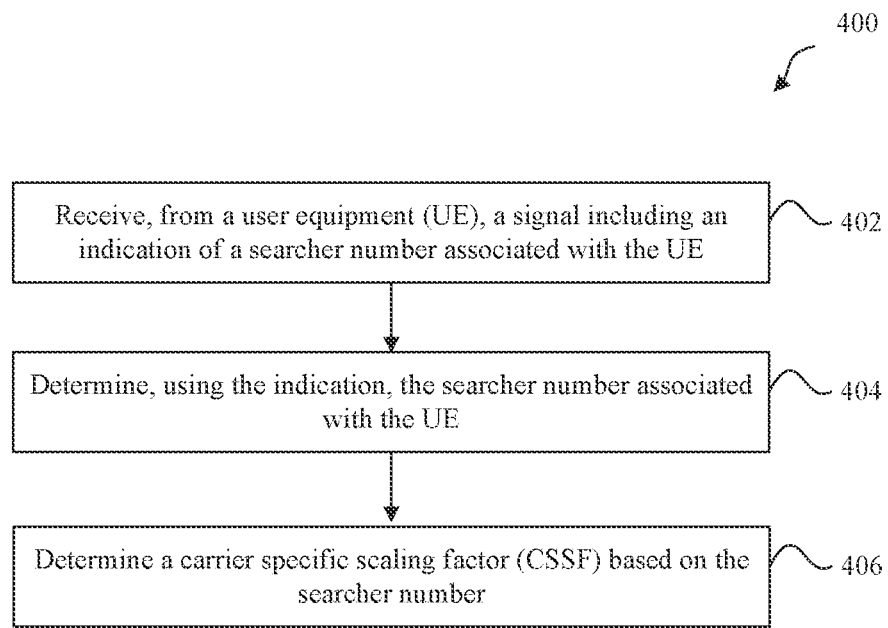
FIG. 4 illustrates an example method for a system (for example a base station) supporting mechanisms for exchanging a searcher number for carrier/cell detection and measurement, according to some embodiments of the disclosure.

FIG. 4 illustrates an example method 400 for a system (for example a base station) supporting mechanisms for exchanging a searcher number for carrier/cell detection and measurement, according to some embodiments of the disclosure. As a convenience and not a limitation, FIG. 4 may be described with regard to elements of FIGS. 1, 2, and 5. Method 400 may represent the operation of an electronic device (for example, base station 101 and/or 103 of FIG. 1) implementing mechanisms for exchanging a searcher number for carrier/cell detection and measurement. Method 400

At 404, the base station can determine, using the received signal, the searcher number associated with the UE. According to some aspects, the searcher number is based on the per-UE capability. In this example, the searcher number can be two or greater than two. Additionally, or alternatively, the searcher number can be based on the per-FR (Frequency Range) capability. In these examples, the searcher number can include a first searcher number associated with FR1 (indicating the number of searcher(s) supported in FR1) and a second searcher number associated with FR2 (indicating the number of searcher(s) supported in FR2). In some examples, the first searcher number can be one or greater than one. The second searcher number can also be one or greater than one. In some embodiments, the searcher number can be based on the per-TAG (Timing Advance (TA) Group (TAG)) capability. In these examples, the searcher number can include a first searcher number associated with pTAG (primary TAG) (indicating the number of searcher(s) supported in pTAG) and a second searcher number associated with sTAG (secondary TAG) (indicating the number of searcher(s) supported in sTAG). In some examples, the first searcher number can be one or greater than one. The second searcher number can also be one or greater than one.

Additionally, or alternatively, the base station can determine the searcher number associated with the UE based on an indication of a 3rd Generation Partnership Project (3GPP) release version used by the UE. For example, an indication representing the release version of R-X or earlier indicates that the searcher number associated with the UE is two. In another example, an indication representing the release version of R-(X+1) or later indicates that the searcher number associated with the UE is greater than two or greater than two. In some examples, X is an integer equal to or greater than sixteen. In one example, an indication representing the release version of R-16 or earlier indicates that the searcher number associated with the UE is two. In another example, an indication representing the release version of R-17 or later indicates that the searcher number associated with the UE is greater than two or greater than two.

According to some aspects, determining the searcher number can include determining an indication of a 3GPP release version used by the UE. In response to the indication representing the release version of R16 or earlier, the base station can determine that a searcher number associated with the UE is 2. In response to the indication representing the release version of R17 or later, the base station can determine that the searcher number associated with the UE is greater than two.

At 406, the base station can determine a carrier specific scaling factor (CSSF) based on the searcher number. Additionally, or alternatively, the base station can use at least one of the CSSF or the searcher number in determining and/or deciding a carrier detection time or a carrier measurement time. According to some embodiments, the base station can use the determined carder detection time and/or the carrier measurement time to determine whether the UE to measure a carrier and/or which carriers to measure. The base station can transmit this information to the UE.

Figure 5:
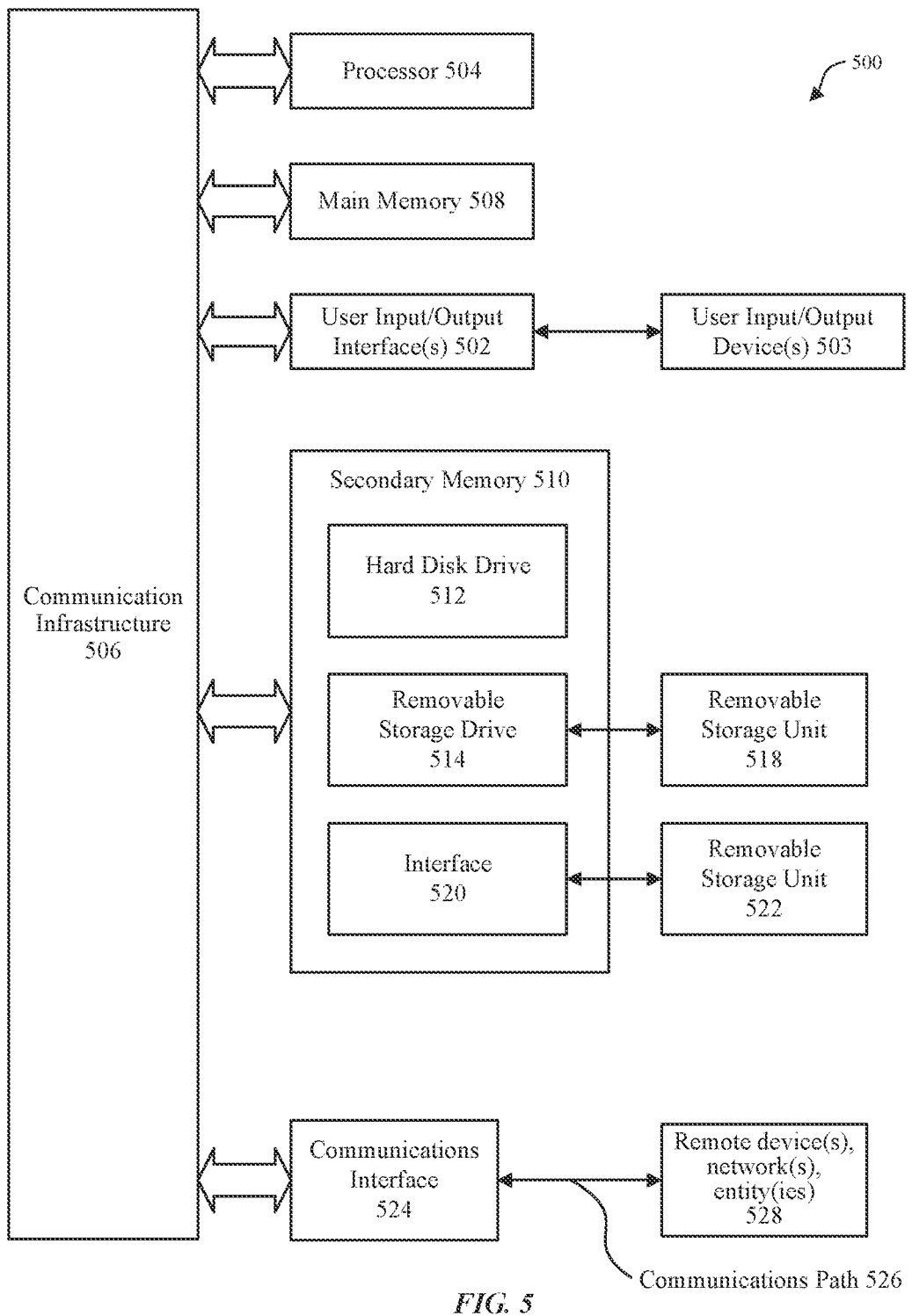
FIG. 5 is an example computer system for implementing some embodiments or portion(s) thereof.

Various embodiments can be implemented, for example, using one or more computer systems, such as computer system 500 shown in FIG. 5. Computer system 500 can be any well-known computer capable of performing the functions described herein such as devices 101, 103, 105 of FIG. 1, or 200 of FIG. 2. Computer system 500 includes one or more processors (also called central processing units, or CPUs), such as a processor 504. Processor 504 is connected to a communication infrastructure 506 (e.g., a bus.) Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/or other computer data storage device. Removable storage drive 514 reads from and/or writes to removable storage unit 518 in a well-known manner.

According to some embodiments, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant ants) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
a transceiver configured to communicate with a network; and
a processor communicatively coupled to the transceiver and configured to:
  determine a searcher number associated with the electronic device, wherein the searcher number is equal to or greater than two;
  transmit, using the transceiver, a signal to the network, wherein the signal comprises an indication of the searcher number;
  determine a carrier specific scaling factor (CSSF) based on the searcher number; and
  use at least one of the CSSF or the searcher number to determine a carrier detection time or a carrier measurement time.

2. The electronic device of claim 1, wherein the processor is configured to transmit the indication of the searcher number using Radio Resource Control (RRC) layer signaling.

3. The electronic device of claim 1, wherein the processor is configured to transmit the indication of the searcher number using Medium Access Control (MAC) layer signaling.

4. The electronic device of claim 1, wherein the processor is configured to transmit the indication of the searcher number using physical (PHY) layer indication.

5. The electronic device of claim 1, wherein the searcher number comprises a number of parallel carriers monitored by the electronic device.

6. An electronic device, comprising:
a transceiver configured to communicate with a network; and
a processor communicatively coupled to the transceiver and configured to:
  determine a first searcher number associated with a first capability of the electronic device and a second searcher number associated with a second capability of the electronic device;
  transmit, using the transceiver, a signal to the network, wherein the signal comprises an indication of the first and second searcher numbers;
  determine a carrier specific scaling factor (CSSF) based on the first and second searcher numbers; and
  use at least one of the CSSF, the first searcher number, or the second searcher number to determine a carrier detection time or a carrier measurement time.

7. The electronic device of claim 6, wherein the processor is configured to transmit the indication of the first and second searcher numbers using Radio Resource Control (RRC) layer signaling.

8. The electronic device of claim 6, wherein the processor is configured to transmit the indication of the first and second searcher numbers using Medium Access Control (MAC) layer signaling.

9. The electronic device of claim 6, wherein the processor is configured to transmit the indication of the first and second searcher numbers using physical (PHY) layer indication.

10. The electronic device of claim 6, wherein the first and second searcher numbers comprise a number of parallel carriers monitored by the electronic device.

11. The electronic device of claim 6, wherein the first searcher number is associated with a first frequency range (FR) and the second searcher number is associated with a second FR.

12. The electronic device of claim 6, wherein the first searcher number is associated with a first Timing Advance Group (TAG) and the second searcher number is associated with a second TAG.

13. A method, comprising:
determining, by a user equipment (UE), a first searcher number associated with a first capability of the UE and a second searcher number associated with a second capability of the UE, wherein each of the first and second searcher numbers comprises a positive integer number;
transmitting, by the UE to a network, a signal comprising an indication of the first and second searcher numbers;
determining a carrier specific scaling factor (CSSF) based on the first and second searcher numbers; and
using the CSSF in deciding a carrier detection time or a carrier measurement time.

14. The method of claim 13, wherein transmitting the signal comprises transmitting the indication of the first and second searcher numbers using Radio Resource Control (RRC) layer signaling.

15. The method of claim 13, wherein transmitting the signal comprises transmitting the indication of the first and second searcher numbers using Medium Access Control (MAC) layer signaling.

16. The method of claim 13, wherein transmitting the signal comprises transmitting the indication of the first and second searcher numbers using physical (PHY) layer indication.

17. The method of claim 13, wherein the first and second searcher numbers comprise a number of parallel carriers monitored by the UE.

18. The method of claim 13, wherein the first searcher number is associated with a first frequency range (FR) and the second searcher number is associated with a second FR.

* * * * *